United States Patent
Wang

(10) Patent No.: US 10,389,934 B2
(45) Date of Patent: Aug. 20, 2019

(54) MOBILE DEVICE AND PHOTOGRAPHING METHOD THEREOF WITH FIRST AND SECOND DISPLAYS AND CAMERAS AND DISPLAYING INFORMATION BASED ON A TARGET CAMERA

(71) Applicant: Hisense Mobile Communications Technology Co., Ltd., Qingdao, Shandong (CN)

(72) Inventor: Yongqing Wang, Shandong (CN)

(73) Assignee: Hisense Mobile Communications Technology Co., Ltd., Qingdao, Shandong (CN)

( * ) Notice: Subject to any disclaimer, the term of this patent is extended or adjusted under 35 U.S.C. 154(b) by 0 days.

(21) Appl. No.: 16/000,592

(22) Filed: Jun. 5, 2018

(65) Prior Publication Data
US 2018/0352146 A1    Dec. 6, 2018

(30) Foreign Application Priority Data

Jun. 6, 2017 (CN) .......................... 2017 1 0418510

(51) Int. Cl.
*H04N 5/232* (2006.01)

(52) U.S. Cl.
CPC ..... *H04N 5/23216* (2013.01); *H04N 5/23219* (2013.01); *H04N 5/23245* (2013.01); *H04N 5/232933* (2018.08); *H04M 2250/16* (2013.01)

(58) Field of Classification Search
CPC ......... H04N 5/23216; H04N 5/232933; H04N 5/23219; H04N 5/23245
See application file for complete search history.

(56) References Cited

U.S. PATENT DOCUMENTS

| 8,749,687 B2* | 6/2014 | Kang ...................... H04N 5/232 348/333.01 |
| 2011/0008036 A1* | 1/2011 | Takatsuka .............. G03B 15/00 396/283 |
| 2012/0081592 A1* | 4/2012 | Lim ................... H04N 5/23293 348/333.04 |

FOREIGN PATENT DOCUMENTS

| CN | 104539844 A | 4/2015 |
| CN | 104580890 A | 4/2015 |

(Continued)

OTHER PUBLICATIONS

State Intellectual Property Office of the People's Republic of China, Office Action and Search Report issued in Application No. 201710418510.4, dated Mar. 5, 2019, 12 pages (submitted with machine translation).

*Primary Examiner* — Nicholas G Giles
(74) *Attorney, Agent, or Firm* — Brinks Gilson & Lione

(57) ABSTRACT

A mobile device and a photographing method thereof are provided for managing display of data between two oppositely provided display screens. Two opposite surfaces of the mobile device are both provided with a display screen and a camera. After starting a target camera, the mobile device displays an image captured by the target camera on a screen located on the opposite surface of the mobile device from the target camera, and also display assistance information for photographing on the other screen located on the same surface of the mobile device as the target camera. The instruction for photographing comprises an identifier of the target camera. The assistance information may be the image captured by the target camera, or other preset assistance information used to improve the photographing effect.

20 Claims, 4 Drawing Sheets

(56) References Cited

FOREIGN PATENT DOCUMENTS

| CN | 105554372 A | 5/2016 |
|----|-------------|--------|
| CN | 106101550 A | 11/2016 |
| JP | 2004-187182 A | 7/2004 |

* cited by examiner

MOBILE DEVICE AND PHOTOGRAPHING METHOD THEREOF WITH FIRST AND SECOND DISPLAYS AND CAMERAS AND DISPLAYING INFORMATION BASED ON A TARGET CAMERA

CROSS REFERENCE TO RELATED APPLICATIONS

This application claims priority to Chinese Patent Application No. 201710418510.4, filed on Jun. 6, 2017, the entirety of which is hereby incorporated by reference herein.

TECHNICAL FIELD

The disclosure relates to a mobile device and a method for photographing on a mobile device.

BACKGROUND

With the rapid development of mobile devices, more and more mobile devices start to adopt a dual-screen design, namely, both front and back surfaces of a mobile device are provided with a display screen. For example, a liquid crystal display (LCD) screen or an organic light-emitting diode (OLED) screen may be arranged on a front surface of a mobile device as a first screen, and an E-ink screen may be arranged on a back surface of the mobile device as a second screen.

SUMMARY

The disclosure provides a mobile device and photographing (e.g., digital image capture) method thereof.

According to some embodiments, a method for photographing on a mobile device is provided that comprises receiving by the mobile device an instruction for photographing which comprises an identifier of a target camera, where a first surface of a main body of the mobile device is provided with a first screen and a first camera and a second surface of the main body opposite to the first surface is provided with a second screen and a second camera. The method also comprises starting the target camera in response to the received instruction for photographing, displaying an image captured by the target camera on one of the first and second screens which is located on the opposite surface of the mobile device from the target camera, and displaying assistance information for photographing on the other one of the first and second screens.

According to some embodiments, a mobile device is provided that comprises a main body with a display screen and a camera arranged on both front and back surfaces of the mobile device. A processor, and a memory in which machine executable instructions are stored are also provided in the mobile device. When the processor executes the machine executable instructions, the method for photographing on the mobile device provided by the present disclosure may be implemented.

According to some embodiments, a non-volatile storage medium is provided in which machine executable instructions are stored. When the machine executable instructions in the non-volatile storage medium are executed by a processor, the method for photographing on a mobile device provided by the present disclosure may be implemented.

BRIEF DESCRIPTION OF DRAWINGS

In order to explain the embodiments of the disclosure clearly, the drawings to be used in describing the embodiments are briefly introduced below. Obviously, the drawings in the following descriptions are only used for some embodiments, and for those skilled in the art, other drawings can also be obtained according to these drawings without creative efforts.

DETAILED DESCRIPTION

In order to make the purpose, technical solutions and advantages of the embodiments clearer, the embodiments will be further described in detail in combination with the drawings.

A mobile device according to the disclosure comprises a main body with a display screen and a camera arranged on each of the two opposite surfaces of the main body, respectively. In this way, both surfaces of the mobile device are provided with a display function and a touch operation ability. Two alternative configurations may also be provided, one configuration being that both surfaces are provided with a liquid crystal display (LCD) screen or an organic light-emitting diode (OLED) display screen; and the other configuration being that one surface of the main body is provided with an LCD or an OLED display screen, and the other surface is provided with an e-ink screen. For convenience of description, herein a display screen on one surface is referred to as a first screen and a display screen on the other surface is referred to as a second screen.

In a dual-screen mobile device, a front camera is provided on the surface corresponding to the first screen of the mobile device, and a rear camera is provided on the surface corresponding to the second screen. When the rear camera is used to capture an image, an image captured by the rear camera may be displayed on the first screen of the mobile device while the second screen may be in a sleep mode.

Figure 1:
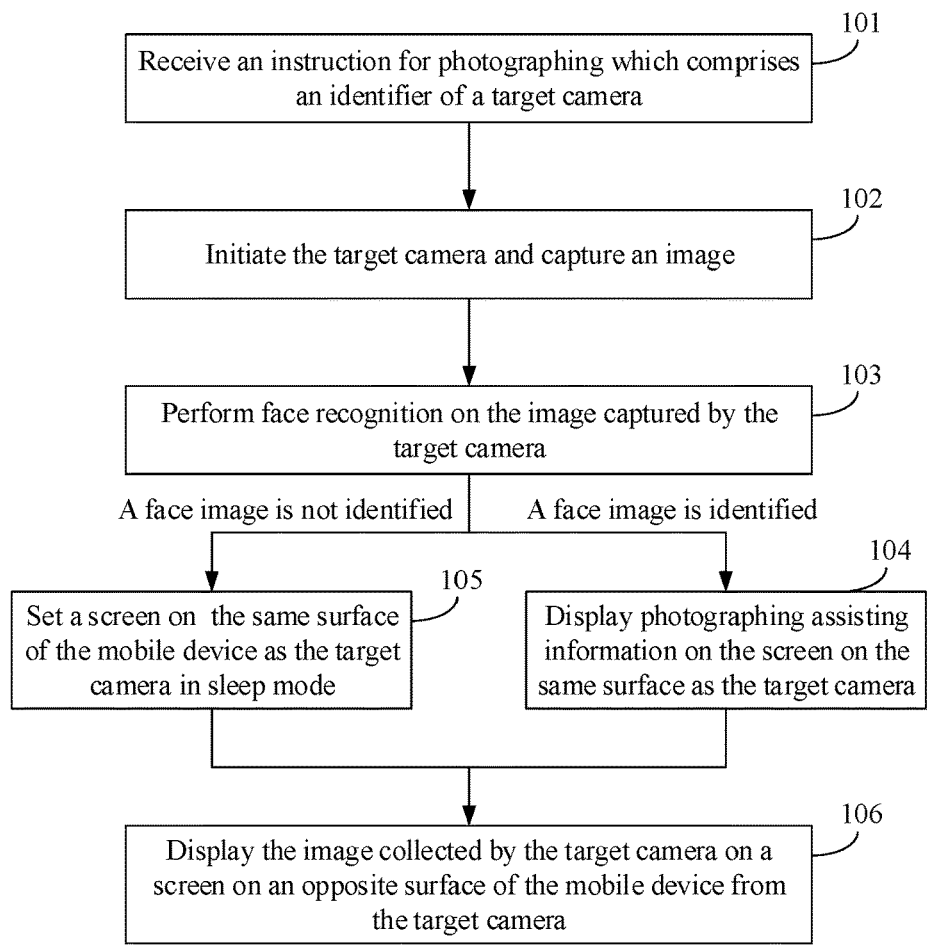
FIG. 1 illustrates a schematic flow chart of a photographing method of a mobile device provided according to an embodiment of the disclosure.

FIG. 1 illustrates a flow chart of a method for photographing on a mobile device according to an embodiment of the disclosure. Referring to FIG. 1, the method comprises the following Steps 101-106.

Step 101, the mobile device receives an instruction for photographing, and the instruction for photographing comprises an identifier of a target camera.

The mobile device has a camera application installed and the camera application is a system application or an application from a third party. When a user clicks an icon of the camera application, the mobile device receives an instruction for photographing, and the instruction comprises an identifier of the target camera to be started. Where, the target camera is a default camera preset by the mobile device, a camera previously used by the mobile device, or a camera selected by the user.

For example, assuming that the default camera of the mobile device is the rear camera, when a user clicks the camera icon, the mobile device receives the instruction for photographing from the user, and the identifier of the target camera carried in the instruction is the identifier of the rear camera.

Step 102, the mobile device starts the target camera in response to the received instruction for photographing.

For example, the mobile device starts the rear camera in response to the instruction for photographing.

Step 103, the mobile device performs face recognition on an image captured by the target camera.

For example, the mobile device performs face recognition on an image captured by the rear camera according to a preset face recognition algorithm. It should be noted that various recognition algorithms can be used to perform the face recognition. The details of these recognition algorithms will not be described herein.

Step 104, when a face image is recognized from the face recognition, the mobile device displays assistance information for photographing on one of the first and second screens located on a same surface of the mobile device as the target camera.

When a face image is recognized from the image captured by the rear camera (corresponding to the second screen), it is determined that the subject of the rear camera comprises a human. In order to improve photographing effect, the mobile device displays the assistance information on the second screen (that is, the screen seen by the human of the subject). In some embodiments, the assistance information is the image captured by the rear camera and preset assistance information comprising at least one of texts and pictures, and the assistance information is used to improve photographing effect.

For example, the preset assistance information may be pleasant information, including but not limited to, smiling face, funny picture or phrases, etc. If the preset assistance information is displayed on the second screen, after the human of the subject sees the preset assistance information, there is a good chance that he or she will smile at the camera. Besides, if the subject comprises a child, the preset assistance information may attract the child's attention. Altogether, the preset assistance information not only allows for an interesting photographing operation, but also makes it easier to take a satisfying picture.

If the image captured by the rear camera is being displayed as the assistance information on the second screen, the subject is able to view the image to be taken, therefore he or she could adjust his/her expression and posture according to the viewed image, so that an improved photographing effect can be achieved.

Figure 2:
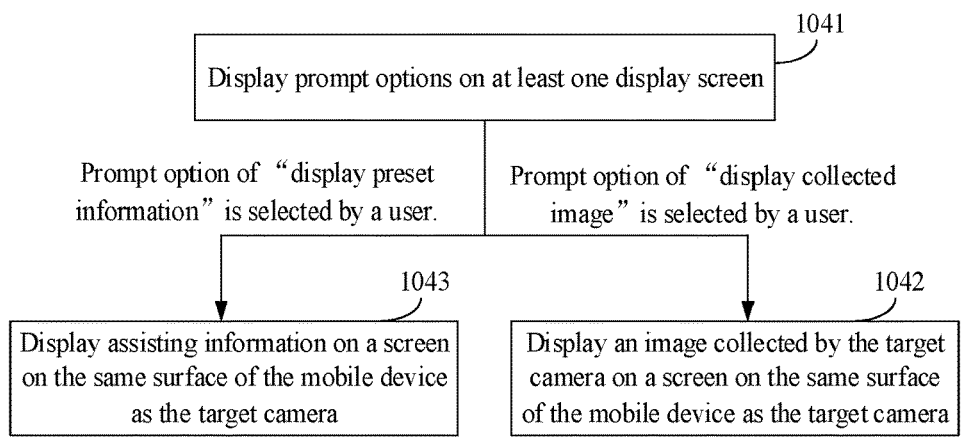
FIG. 2 illustrates a schematic flow chart of a method of determining display contents provided according to an embodiment of the disclosure.

After the target camera is started, referring to FIG. 2, the mobile device carries out the following Steps 1041-1043.

Step 1041, the mobile device displays prompt options on at least one display screen. The prompt options comprise displaying preset assistance information and displaying captured image.

In order to make it easier for a user to select different display contents, the mobile device is configured to display prompt options on at least one screen after starting the target camera The prompt options are configured to be selected by a photographer or the subject. For example, when the mobile device displays the prompt options on the first screen, the prompt options are selected by the photographer. When the mobile device displays the prompt options on the second screen, the prompt options are selected by the subject. When the prompt options are displayed on both screens of the mobile device, the prompt options are selected by the photographer or the subject.

Figure 3:
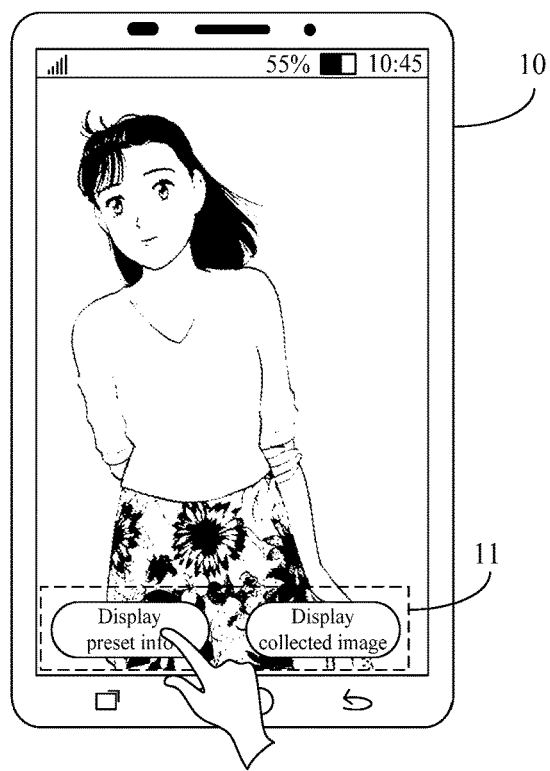
FIG. 3 illustrates a schematic diagram of an interface of prompt options provided according to an embodiment of the disclosure.

For example, as shown in FIG. 3, after the rear camera is started, the mobile device displays the prompt options 11 on the first screen 10. In this way, the photographer is able to select to display the preset assistance information or display the captured image on the second screen according to the prompt options 11. Displaying the preset assistance information refers to displaying the preset assistance information which comprises text and/or pictures, etc., and displaying the captured image refers to displaying the image captured by the rear camera currently.

Step 1042, when it is detected that a prompt option selected by a user is displaying the preset assistance information, the preset assistance information is displayed on the second screen.

The preset assistance information is either preset in the system configuration or added by a user. The embodiments of the disclosure are not limited with respect to the configuration of the assistance information.

For example, when the user clicks the option of "display preset assistance information" on the first screen interface shown in FIG. 3, the mobile device displays the preset assistance information on the second camera, such as a smiling face, a funny image or text, etc.

After the target camera is started or it is detected that a prompt option for displaying assistance information is selected by a user, the mobile device may also display optional assistance information on at least one screen. The optional assistance information may comprise at least one of texts and images.

Figure 4:
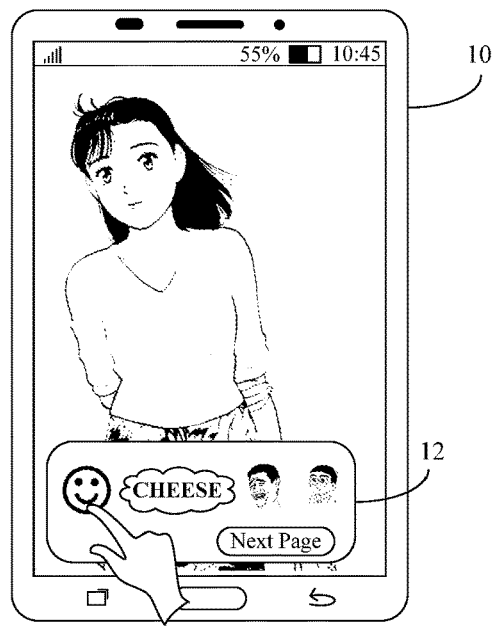
FIG. 4 illustrates a schematic diagram of an interface of optional assistance information for photographing provided according to an embodiment of the disclosure.

For example, when the user clicks the option of "display preset assistance information" on the first screen interface shown in FIG. 3, referring to FIG. 4, the mobile device may display the optional assistance information 12 on the first screen 10. As shown in FIG. 4, the optional assistance information comprises a text of "Cheese", an image of smiling face, images of funny figures, etc.

Further, the user may select one or more pieces of assistance information to be displayed from the optional assistance information by a preset touch operation. In this way, on receiving the preset touch operation, the mobile device may display the one or more pieces of assistance information on the second screen, which not only greatly enriches the photographing scene but also improves the flexibility of photographing.

Figure 5:
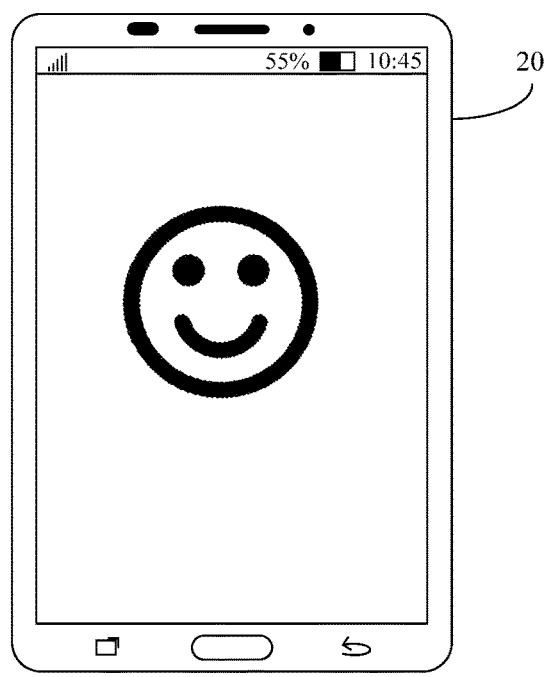
FIG. 5 illustrates a schematic diagram of preset assistance information for photographing displayed on a display screen on a same side of a mobile device as a target camera provided according to an embodiment of the disclosure.

For example, when a user clicks the image of smiling face on the first screen interface shown in FIG. 4, referring to FIG. 5, the mobile device may display the image of smiling face on the second screen 20. After the subject sees the image of smiling face, there is chance that he or she will smile at the camera, which makes it easier to take a satisfying picture.

Step 1043, when the prompt option selected by the user is detected to be displaying the captured image, the image captured by the target camera is displayed on the second screen.

If a user selects the option of "display the captured image" on the interface shown in FIG. 3, the mobile device displays the image captured by the rear camera 20 on the second screen. In this way, the image captured by the rear camera is displayed on both screens of the mobile device. Since the subject is able to see himself/herself through the second screen, it is convenient for the subject to adjust his/her expression and posture, thus an improved user's experience can be achieved.

In Step 105, when no face image is recognized from the face recognition, the mobile device sets one of the first and second screens located on the same surface of the mobile device as the target camera in sleep mode.

When no human face is recognized from the face recognition in step 103, it is determined that the photographed subject is an inanimate object, and thus the mobile device sets the second screen in sleep mode, so as to lower power consumption and save power.

In Step 106, the image captured by the target camera is displayed on the other one of the first and second screens.

After the rear camera is started in step 102, the mobile device displays the image captured by the rear camera on the first screen.

In some embodiments, there are two shooting modes provided in the mobile device, one is normal mode, the other one is selfie mode. In selfie mode, the target camera started and the screen for displaying an image captured by the target camera are on the same surface of the mobile device. The instructions for photographing in the above embodiments refer to instructions for starting the normal mode. If the mobile device receives an instruction for photographing to start the selfie mode, the target camera is started, and then the captured image is being displayed on a screen on the same surface as the target camera, and the other screen is set in sleep mode by the mobile device.

It shall be noted that the sequences of the steps of the method provided by the above embodiments may be adjusted if necessary, and the steps may also be omitted if needed. For example, Step 106 may be performed prior to step 103, or may be performed at the same time with step 103. Various methods which may be easily obtained by one of ordinary skill in the art within the scope disclosed by the embodiments shall fall within the scope of the disclosure.

In the method for photographing on a mobile device according to the embodiments, after starting the target camera in response to an instruction for photographing, the mobile device displays the image captured by the target camera on the screen located on an opposite surface of the mobile device from the target camera, and displays the assistance information on the other screen on a same surface as the target camera. Therefore, a more flexible and interesting shooting method is provided, and an improved user experience is achieved.

Figure 6:
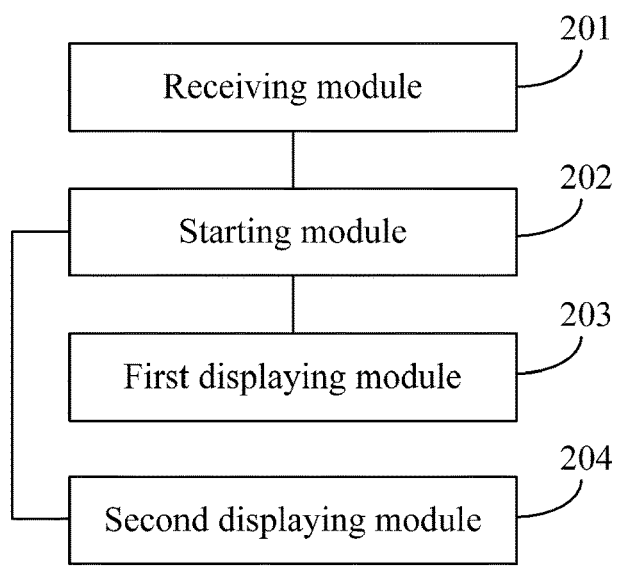
FIG. 6 illustrates a structural diagram of a mobile device provided according to an embodiment of the disclosure.

The embodiments of the disclosure also provide a mobile device. A main body of the mobile device has two opposite surfaces, and a display screen and a camera is arranged on both surfaces, respectively. FIG. 6 is a structural diagram of the mobile device provided by the embodiments of the disclosure. Referring to FIG. 6, the mobile device comprises a receiving module 201, a starting module 202, a first displaying module 203 and a second displaying module 204.

Where, the receiving module 201 is configured to receive an instruction for photographing, and the instruction for photographing comprises an identifier of a target camera.

The starting module 202 is configured to start the target camera in response to the instruction for photographing.

The first displaying module 203 is configured to display an image captured by the target camera on a screen on an opposite surface of the mobile device from the target camera.

The second displaying module 204 is configured to display assistance information for photographing on a screen on a same surface of the mobile device as the target camera.

Where, the assistance information may comprise the image captured by the target camera and other preset assistance information. For example, the preset assistance information may comprise at least one of texts and pictures which may be used to improve photographing effect.

Figure 7:
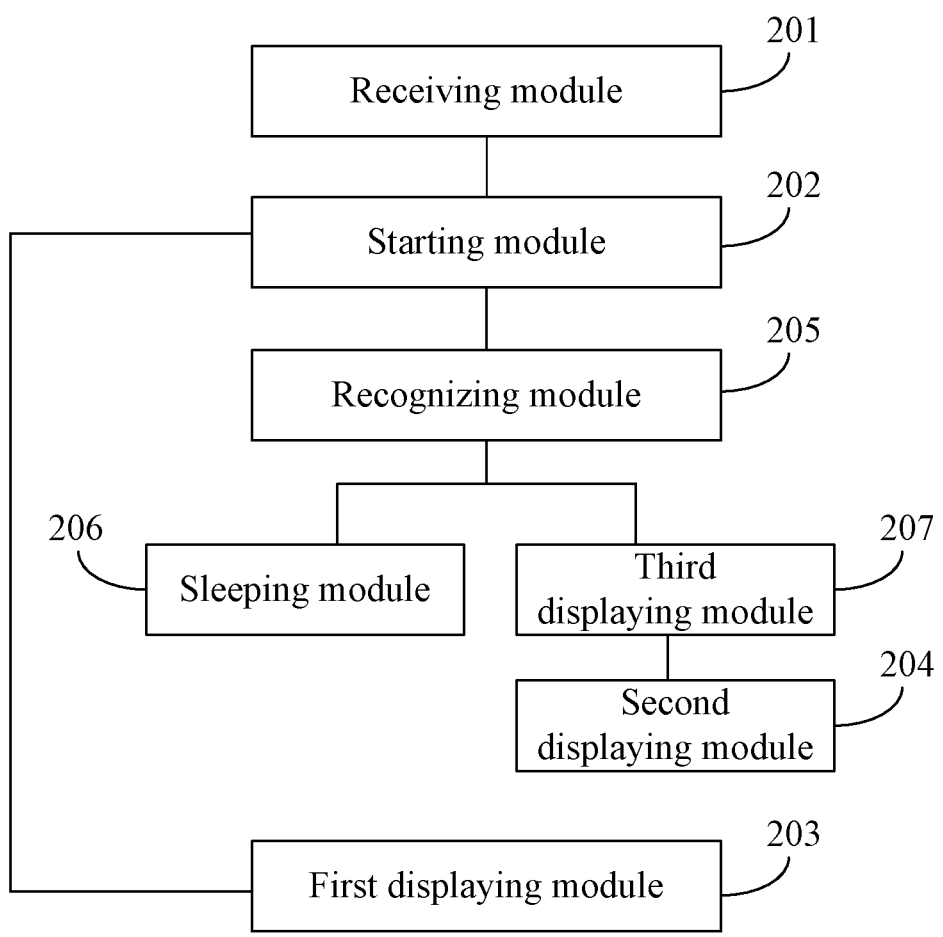
FIG. 7 illustrates a structural diagram of a mobile device provided according to another embodiment of the disclosure.

Referring to FIG. 7, the mobile device also comprises a recognizing module 205. The recognizing module 205 may be configured to perform face recognition on the image captured by the target camera. Under such circumstance, the second displaying module 204 specifically may be configured to display the assistance information on the screen on the same surface of the mobile device as the target camera when the recognizing module 205 recognizes a face image.

Further, referring to FIG. 7, the mobile device also comprises a sleeping module 206. The sleeping module 206 may be configured to set the screen on the same surface of the mobile device as the target camera in sleep mode when the recognizing module 205 has not recognized a face image In addition, referring to FIG. 7, the mobile device also comprises a third displaying module 207. The third displaying module 207 may be configured to display prompt options on at least one display screen, and the prompt options may comprise displaying preset assistance information and displaying captured image.

Under such circumstance, the second displaying module 204 specifically may be configured to display preset assistance information on the screen on the same surface of the mobile device as the target camera when a prompt option selected by a user is detected to be displaying the preset assistance information, and display the image captured by the target camera on the screen on the same surface as the target camera when the prompt option selected by the user is detected to be displaying the captured image.

In addition, the second displaying module 204 specifically may also be configured to display optional preset assistance information on at least one display screen when the user-selected prompt option is detected to be displaying the preset assistance information, and display information selected by the user from the optional preset assistance information on the screen on the same surface of the mobile device as the target camera. Where, the optional preset assistance information may also comprise at least one of texts and pictures which may be used to improve photographing effect.

In summary, after starting the target camera in response to the received photographing instruction, the mobile device provided according to the embodiment of the disclosure may display the image captured by the target camera on the screen on the same surface of the mobile device as the target camera, and display the assistance information on the screen on the opposite surface of the mobile device from the target camera, therefore, greatly enriching the photographing scene of the mobile device, improving flexibility of photographing method, and improving user's experience.

The embodiment of the disclosure provides a mobile device in which a display screen and a camera are arranged on opposite surfaces of the main body, respectively.

The embodiment of the disclosure provides a non-volatile storage medium, and the non-volatile storage medium stores instructions thereon. When the instructions are executed on a processor, the processor may be caused to perform the photographing method as shown in FIG. 1 or FIG. 2.

One of ordinary skill in the art may clearly understand that for convenience and conciseness of description, the specific operating processes of the mobile device and the modules described above may refer to the corresponding processes of the previously described methods in the embodiment, and it will not be repeated hereby.

The above mentioned are only preferred embodiments of the disclosure, they are not used to limit the disclosure, and any modification, equivalent replacement, improvement, etc. within the spirit and principle of the disclosure shall be all within the protective scope of the disclosure.

What is claimed is:

1. A method for photographing on a mobile device, comprising:
   receiving, by the mobile device, an instruction for photographing, the instruction for photographing comprising an identifier of a target camera, wherein a first screen and a first camera are both located on a first surface of a main body of the mobile device, a second screen and a second camera are both located on a second surface of the main body opposite to the first surface, and the target camera is one of the first camera or the second camera;
   initiating the target camera;
   capturing, by the target camera, an image;
   displaying, on one of the first screen or the second screen that is located on an opposite surface of the main body from the target camera, the image captured by the target camera; and
   displaying, on the other one of the first screen or the second screen that is located on a same surface of the main body as the target camera, assistance information for photographing.

2. The method according to claim 1, wherein the assistance information for photographing comprises:
   the image captured by the target camera.

3. The method according to claim 1, wherein the assistance information for photographing comprises:
   preset assistance information for photographing which comprises at least one of texts and pictures to improve photographing effect.

4. The method according to claim 1, wherein displaying the assistance information for photographing comprises:
   performing face recognition on the image captured by the target camera; and
   displaying, on the other one of the first screen or the second screen that is located on the same surface of the main body as the target camera, the assistance information for photographing when a face image is recognized from the performed face recognition.

5. The method according to claim 4, further comprising:
   setting the other one of the first screen or the second screen that is located on the same surface of the main body as the target camera into a sleep mode when a face image is not recognized from the performed face recognition.

6. The method according to claim 1, wherein displaying the assistance information for photographing further comprises:
   displaying prompt options for displaying the assistance information on at least one screen of the mobile device; and
   displaying, on the other one of the first screen or the second screen that is located on the same surface of the main body as the target camera, the assistance information according to a prompt option selected from the displayed prompt options according to a received user input.

7. The method according to claim 6, wherein displaying, on the other one of the first screen or the second screen that is located on the same surface of the main body as the target camera, the assistance information according to the prompt option selected from the displayed prompt options according to the received user input, comprises:
   displaying preset assistance information on the other one of the first screen and the second screen when the prompt option selected by the user is to display the preset assistance information; and
   displaying the image captured by the target camera on the other one of the first screen and the second screen when the prompt option selected by the user is to display the image captured by the target camera.

8. The method according to claim 1, wherein displaying the assistance information further comprises:
   displaying optional assistance information on at least one of the first screen or the second screen; and
   displaying a piece of information selected by a user input from the optional assistance information on the other one of the first screen or the second screen that is located on the same surface of the main body as the target camera.

9. The method according to claim 1, wherein displaying the assistance information further comprising:
   determining whether a current photographing mode of the mobile device is a selfie mode; and
   displaying the assistance information on the other one of the first screen or the second screen that is located on the same surface of the mobile device as the target camera in response to determining the current photographing mode is not the selfie mode.

10. The method according to claim 9, further comprising:
    setting one of the first screen or the second screen that is not activated in the selfie mode into a sleep mode in response to determining that the current photographing mode is the selfie mode.

11. A mobile device, comprising:
    a main body comprised of a first surface and a second surface opposite the first surface, wherein the first surface includes a first display screen and a first camera, and the second surface includes a second display screen and a second camera;
    a memory configured to store machine executable instructions; and
    a processor configured to execute the instructions to cause the processor to:
    receive an instruction for photographing, the instruction for photographing comprising an identifier of a target camera, wherein the target camera is one of the first camera or the second camera;
    initiate the target camera;
    control the target camera to capture an image;
    display, on one of the first screen or the second screen that is located on the opposite surface of the main body from the target camera, the image captured by the target camera; and
    display, on the other one of the first screen or the second screen that is located on a same surface of the main body as the target camera, assistance information for photographing.

12. The mobile device according to claim 11, wherein the assistance information for photographing comprises:
    the image captured by the target camera, and
    preset assistance information for photographing which comprises at least one of texts and pictures used to improve photographing effect.

13. The mobile device according to claim 11, wherein the processor is configured to execute the machine executable instructions to display the assistance information by causing the processor to:

perform face recognition on the image captured by the target camera; and display, on the other one of the first screen or the second screen that is located on the same surface of the main body as the target camera, the assistance information for photographing when a face image is recognized from the performed face recognition.

14. The mobile device according to claim 13, wherein the processor is further configured to execute the machine executable instructions to:

set the other one of the first screen or the second screen that is located on the same surface of the main body as the target camera into a sleep mode when a face image is not recognized from the performed face recognition.

15. The mobile device according to claim 11, wherein the processor is configured to execute the machine executable instructions to display the assistance information for photographing by causing the processor to:

display prompt options for displaying the assistance information on at least one display screen of the mobile device; and display, on the other one of the first screen or the second screen that is located on the same surface of the main body as the target camera, the assistance information according to a prompt option selected from the displayed prompt options according to a received user input.

16. The mobile device according to claim 15, wherein the processor is configured to execute the machine executable instructions to display, on one of the first screen or the second screen that is located on the same surface of the main body as the target camera, the assistance information according to the prompt option selected from the displayed prompt options according to the received user input, by causing the processor to:

display preset assistance information on the other one of the first screen and the second screen when the prompt option selected by the user is to display the preset assistance information; and display the image captured by the target camera on the other one of the first screen and the second screen when the prompt option selected by the user is to display the image captured by the target camera.

17. The mobile device according to claim 11, wherein the processor is configured to execute the machine executable instructions to display the assistance information by further causing the processor to:

display optional assistance information on at least one of the first screen or the second screen; and display a piece of information selected by a user input from the optional assistance information on the other one of the first screen or the second screen that is located on the same surface of the main body as the target camera.

18. The mobile device according to claim 11, wherein the processor is configured to execute the machine executable instructions to display the assistance information by further causing the processor to:

determine whether a current photographing mode is a selfie mode; and display the assistance information on the other one of the first screen or the second screen that is located on the same surface of the mobile device as the target camera in response to determining the current photographing mode is not the selfie mode.

19. The mobile device according to claim 18, wherein the processor is further configured to execute the machine executable instructions to:

set one of the first screen or the second screen that is not activated in the selfie mode into a sleep mode in response to determining that the current photographing mode is the selfie mode.

20. A non-transitory storage medium configured to store machine executable instructions that, when executed by a processor of a mobile device, cause the processor to:

receive an instruction for photographing, the instruction for photographing comprising an identifier of a target camera, wherein the target camera is one of a first camera located on a first surface of the mobile device or a second camera located on a second surface of the mobile device, and the first surface includes a first screen and the second surface includes a second screen;

initiate the target camera;

control the target camera to capture an image;

display, on one of the first screen or the second screen that is located on an opposite surface from the target camera, the image captured by the target camera; and display, on the other one of the first screen or the second screen that is located on a same surface of the main body as the target camera, assistance information for photographing.

* * * * *